United States Patent
Cohen

(10) Patent No.: US 9,436,440 B1
(45) Date of Patent: Sep. 6, 2016

(54) SYSTEM, METHOD, AND COMPUTER PROGRAM FOR VALIDATING WEB SERVICE INTERFACE DESIGN

(71) Applicant: Amdocs Software Systems Limited, Dublin (IE)

(72) Inventor: Yossi Cohen, Hod-Hasharon (IL)

(73) Assignee: Amdocs Software Systems Limited, Dublin (IE)

( * ) Notice: Subject to any disclaimer, the term of this patent is extended or adjusted under 35 U.S.C. 154(b) by 37 days.

(21) Appl. No.: 14/188,600

(22) Filed: Feb. 24, 2014

Related U.S. Application Data

(60) Provisional application No. 61/807,350, filed on Apr. 2, 2013.

(51) Int. Cl.
    *G06F 9/44* (2006.01)
    *G06F 9/445* (2006.01)

(52) U.S. Cl.
    CPC ............ *G06F 8/315* (2013.01); *G06F 8/10* (2013.01); *G06F 8/24* (2013.01); *G06F 9/4433* (2013.01); *G06F 9/44589* (2013.01)

(58) Field of Classification Search
    CPC .......... G06F 8/10; G06F 8/24; G06F 9/4433; G06F 9/44589
    USPC ................. 717/104, 108, 116, 118
    See application file for complete search history.

(56) References Cited

U.S. PATENT DOCUMENTS

| | | | |
|---|---|---|---|
| 8,082,491 B1* | 12/2011 | Abdelaziz et al. | 715/234 |
| 2003/0145047 A1* | 7/2003 | Upton | 709/203 |
| 2003/0167444 A1* | 9/2003 | Zorc | G06F 8/30 715/234 |
| 2004/0015840 A1* | 1/2004 | Walker | G06F 9/465 717/108 |
| 2006/0242187 A1* | 10/2006 | Scharf | 707/102 |

(Continued)

OTHER PUBLICATIONS

Brett McLaughlin, Java and XML Data Binding, May 2002, O'Reilly, Chapt. 4 & 5.*

(Continued)

*Primary Examiner* — Phillip H Nguyen
(74) *Attorney, Agent, or Firm* — Zilka-Kotab, PC

(57) ABSTRACT

A system, method, and computer program product are provided for validating web service interface design. In use, an object-oriented information model including JAVA® code associated with JAVA® programming language to be converted to a document-oriented model described in Extensible Markup Language (XML) is identified. Further, one or more objects associated with the object-oriented information model that are associated with a plurality of instances are automatically identified. In addition, for each of the one or more objects associated with the plurality of instances, either: the one or more objects are stored in a location other than the object-oriented information model and each of the plurality of instances of the one or more objects are replaced with a reference to the one or more objects in the location other than the object-oriented information model; the plurality of objects are indicated as being safe, thus signifying the plurality of objects are not significant; or the plurality of objects are indicated as being contained by a corresponding owning object, thus indicating that there can be no duplication of these objects. In response, the object-oriented information model is annotated as being optimized. Still yet, the object-oriented information model is automatically validated based, at least in part, on the object-oriented information model being annotated as optimized.

18 Claims, 8 Drawing Sheets

(56) References Cited

U.S. PATENT DOCUMENTS

2007/0067384 A1    3/2007  Angelov
2008/0243914 A1*  10/2008  Prahlad .............. G06F 11/1453
2010/0332401 A1* 12/2010  Prahlad et al. ................ 705/80

OTHER PUBLICATIONS

Maruyama et al., "A Case Tool Platform Using an XML Representation of Java Source Code", 2004.*

* cited by examiner

```
<RetrieveCustomersReturn>
    <CustomerList>
        <Customer>
            ...
            <ProductInstance>
                ...
                <ProductDefinition>
                    ...
                </ProductDefinition>
            </ProductInstance>
            ...
        </Customer>
        ...
    </CustomerList>
</RetrieveCustomersReturn>
```

Product Definitions can be duplicated by one customer having many instances of the same product, or by many customers have instances of the same product.

```
<RetrieveCustomersReturn>
  <CustomerList>
    <Customer>
      ...
      <ProductInstance>
        ...
        <ProductDefinitionId>
          <id>1098754</id>
        </ProductDefinitionId>
      </ProductInstance>
      ...
    </Customer>
    ...
  </CustomerList>
  <ProductDefinitionsReferenced>
    <ProductDefinition>
      <id>1098754</id>
      ...
    </ProductDefinition>
    ...
  </ProductDefinitionsReferenced>
</RetrieveCustomersReturn>
```

Callout (on `<ProductDefinitionId>`): Instead of containing the product definition, only the ID is contained.

Callout (on `<ProductDefinitionsReferenced>`, 702): The full product definitions are extracted to a separate container.

SYSTEM, METHOD, AND COMPUTER PROGRAM FOR VALIDATING WEB SERVICE INTERFACE DESIGN

CLAIM OF PRIORITY

This application claims the benefit of U.S. Provisional Application No. 61/807,350, filed Apr. 2, 2013, the entire contents of which are incorporated herein by reference.

FIELD OF THE INVENTION

The present invention relates to web service interface design, and more particularly to validating, at design time, that messages transferred by the web service are well formed.

BACKGROUND

Extensible Markup Language (XML) Web services based on Simple Object Access Protocol (SOAP) are the ubiquitous mechanism for integrating heterogeneous enterprise IT applications, defined by Web Services Description Language (WSDL) files and supporting XML Schema Definition (XSD) files. The interfaces are commonly designed using the JAVA® programming language, and the WSDL/XSD is generated using JAVA® technologies such as JAVA® beans, JAVA® Architecture for XML Binding (JAXB), and JAVA® API for XML Web Services (JAX-WS).

Using this approach, a problem arises when the object-oriented information model described in JAVA® is converted to the document-oriented model expressed by XML. In particular, if there are multiple references to the same object, an associated message will be bloated with duplicated data, as the references are expressed as nested XML elements. Although JAVA® has some primitive mechanisms to remedy this problem, there is no ability to prevent this from happening at design time.

There is thus a need for addressing these and/or other issues associated with the prior art.

SUMMARY

A system, method, and computer program product are provided for validating web service interface design. In use, an object-oriented information model including JAVA® code associated with JAVA® programming language to be converted to a document-oriented model described in Extensible Markup Language (XML) is identified. Further, one or more objects associated with the object-oriented information model that are associated with a plurality of instances are automatically identified. In addition, for each of the one or more objects associated with the plurality of instances, either: the one or more objects are stored in a location other than the object-oriented information model and each of the plurality of instances of the one or more objects are replaced with a reference to the one or more objects in the location other than the object-oriented information model; the plurality of objects are indicated as being safe, thus signifying the plurality of objects are not significant; or the plurality of objects are indicated as being contained by a corresponding owning object, thus indicating that there can be no duplication of these objects. In response, the object-oriented information model is annotated as being optimized. Still yet, the object-oriented information model is automatically validated based, at least in part, on the object-oriented information model being annotated as optimized.

BRIEF DESCRIPTION OF THE DRAWINGS

FIG. 6 shows a data structure illustrating how duplicate data may be structured in an XML document returned by a web service operation that is naively defined, in accordance with one example.

FIG. 7 shows a data structure illustrating how duplicated data may be removed, in accordance with one embodiment.

DETAILED DESCRIPTION

Figure 1:
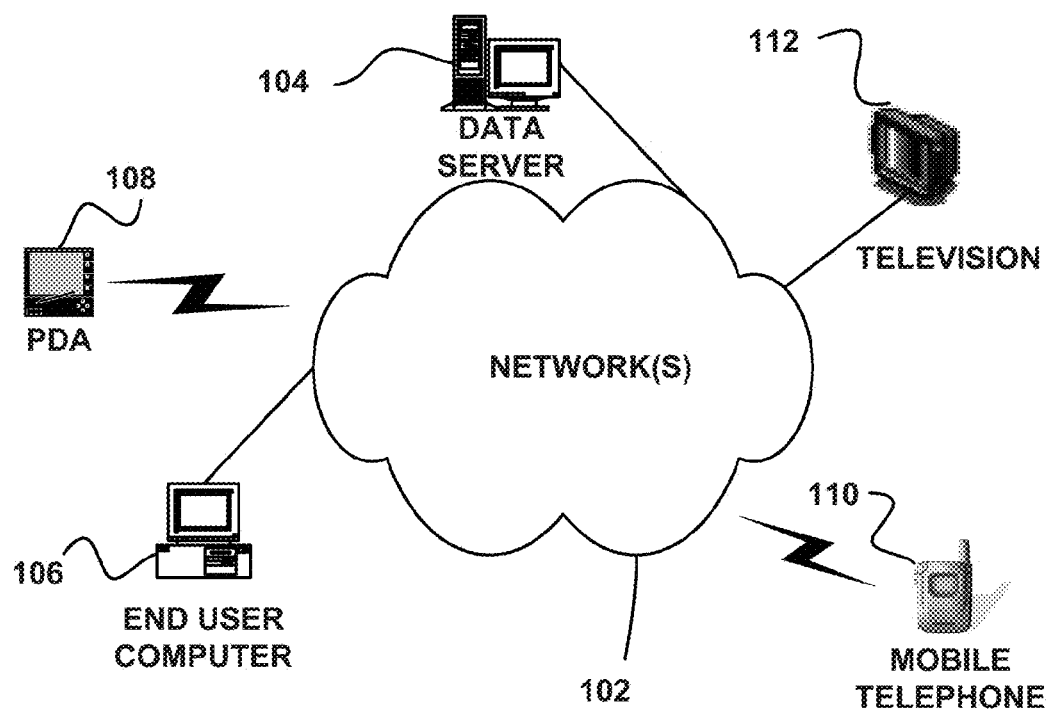
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
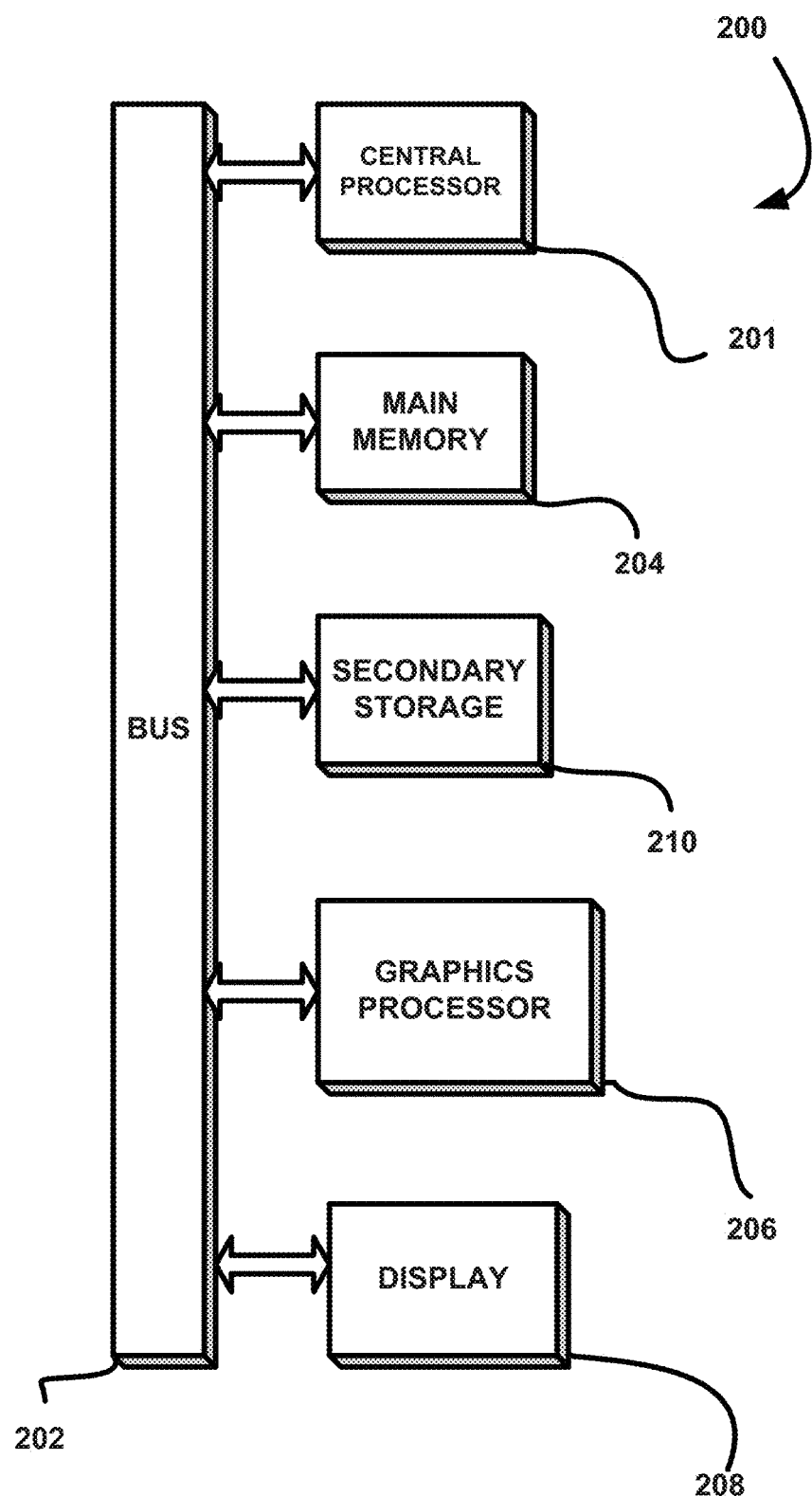
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter.

Such computer programs, when executed, enable the system 200 to perform various functions (to be set forth below, for example). Memory 204, storage 210 and/or any other storage are possible examples of tangible computer-readable media.

Figure 3:
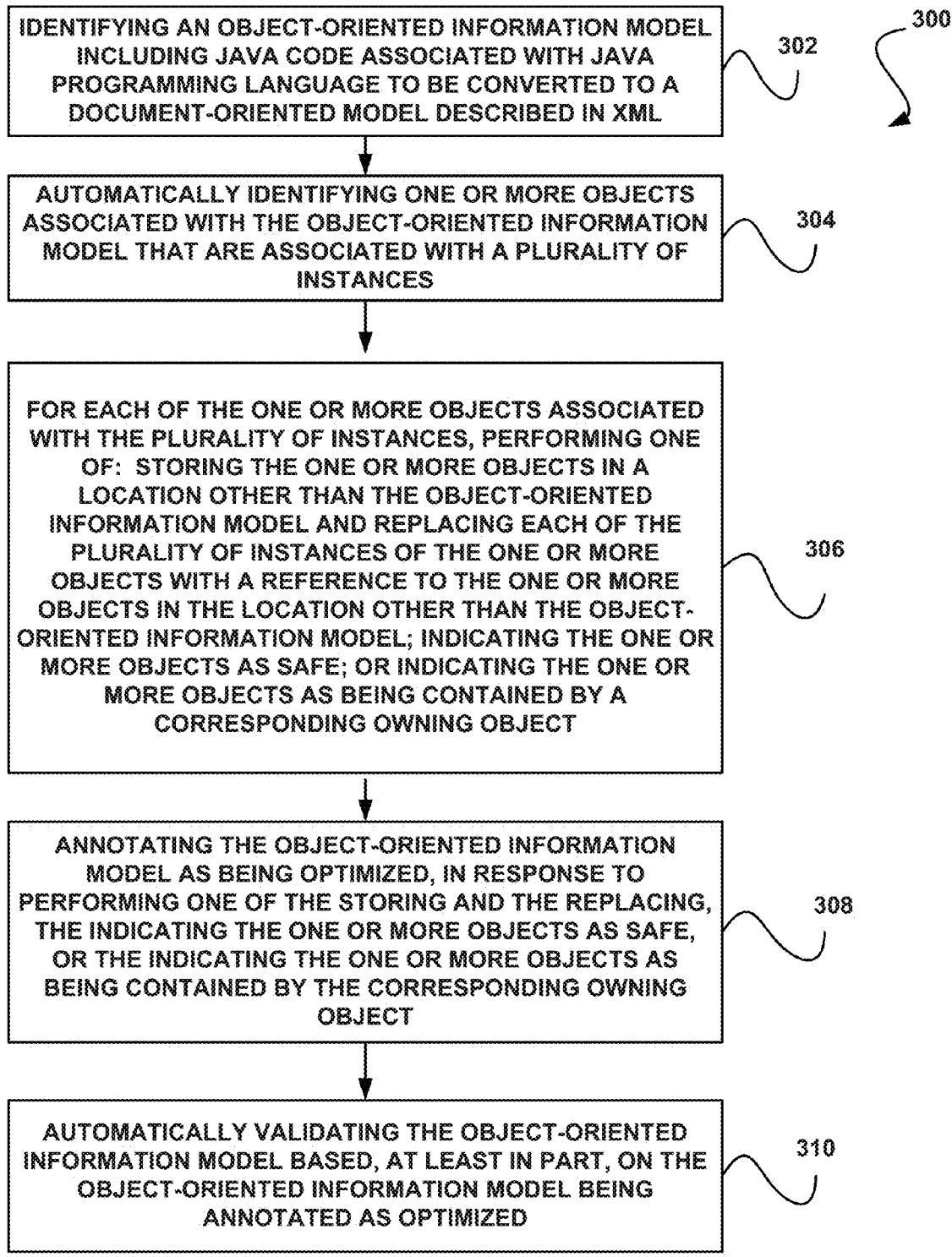
FIG. 3 illustrates a method for validating web service interface design, in accordance with one embodiment.

FIG. 3 illustrates a method 300 for validating web service interface design, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, an object-oriented information model including JAVA® code associated with JAVA® programming language to be converted to a document-oriented model described in Extensible Markup Language (XML) is identified. See operation 302. The object-oriented information model may include any code, message, and/or model, etc. For example, in one embodiment, the object-oriented information model may be associated with a web service interface, a web service object, an application programming interface (API), and/or various other object-oriented information models. In one embodiment, the object-oriented information model including JAVA® code associated with JAVA® programming language may be converted to the document-oriented model described in XML at runtime.

As shown further in FIG. 3, one or more objects associated with the object-oriented information model that are associated with a plurality of instances are automatically identified. See operation 304. For example, in one embodiment, identifying the one or more objects associated with the object-oriented information model that are associated with the plurality of instances may include identifying objects in the JAVA® code that are referenced more than once. Further, in one embodiment, identifying the one or more objects associated with the object-oriented information model that are associated with the plurality of instances may include identifying objects in the JAVA® code that include more than one object definition.

In addition, for each of the one or more objects associated with the plurality of instances, either: the one or more objects are stored in a location other than the object-oriented information model and each of the plurality of instances of the one or more objects are replaced with a reference to the one or more objects in the location other than the object-oriented information model; the plurality of objects are indicated as being safe, thus signifying the plurality of objects are not significant; or the plurality of objects are indicated as being contained by a corresponding owning object, thus indicating that there can be no duplication of these objects. See operation 306.

In one embodiment, storing the one or more objects in the location other than the object-oriented information model may include storing the one or more objects in a defined data container that is outside of the object-oriented information model. In one embodiment, the defined container may include a data structure capable of storing the one or more objects. The location may include any location in memory (e.g. internal and/or external, etc.).

Additionally, in one embodiment, replacing each of the plurality of instances of the one or more objects with the reference to the one or more objects in the location other than the object-oriented information model may include replacing each of the plurality of instances of the one or more objects with a reference to the defined container that is outside of the object-oriented information model. As an option, the reference to the defined container that is outside of the object-oriented information model may include an identification associated with the one or more objects. The identification may include any type of identifier associated with the object, such as a name and/or number, etc.

In various embodiments, the reference may include any type of information and/or be associated with various information. Further, in one embodiment, the reference may include a character string. In another embodiment, the reference may include a pointer. In another embodiment, the reference may include a number. Of course, in various embodiments, the reference may come in a variety of forms.

The object-oriented information model is annotated as being optimized, in response to performing one of the storing and the replacing, the indicating the one or more objects as safe, or the indicating the one or more objects as being contained by the corresponding owning object. See operation 308. The annotation may include any form.

For example, the annotation may include a log indicating the references to duplicate objects were removed. In another embodiment, the reference inserted may serve as the annotation, thereby indicating duplicate objects were replaced. For example, in one embodiment, the presence of a reference in the object-oriented information model may serve as the annotation. In another embodiment, a flag may be used to annotate the object-oriented information model as being optimized.

In another embodiment, a notification may be sent to a user indicating the object-oriented information model is optimized (e.g. and thereby serving as the annotation, etc.). In another embodiment, the annotation may include a descriptor or character string that becomes part of the object-oriented information model or a message associated therewith. Of course, in various embodiments, the object-oriented information model may be annotated as being optimized in a variety of ways.

As shown further in FIG. 3, the object-oriented information model is automatically validated based, at least in part, on the object-oriented information model being annotated as optimized. See operation 310. In various embodiments, the automatic validation may include various other validation steps.

For example, in one embodiment, automatically validating the optimized object-oriented information model may further include verifying the reference to the one or more objects in the location other than the object-oriented information model is of the type "java.util.List." As another example, automatically validating the optimized object-oriented information model may further include verifying the reference to the one or more objects in the location other than the object-oriented information model is associated with at least one object identifier. In either case, in one embodiment, the method 300 may further include converting at least a portion of the object-oriented information model including the JAVA® code to the document-oriented model described in XML, as a result of the automatic validation.

Still yet, in one embodiment, the method 300 may include reporting that there are one or more objects associated with the plurality of instances in the object-oriented information model. As an example, reporting that there are one or more objects associated with the plurality of instances in the object-oriented information model may include displaying an message utilizing a user interface. Further, in one embodiment, the method 300 may further include indicating the object-oriented information model is safe to use, based on the automatic validation. As an example, the indication may be presented in the form of a message to a user utilizing a user interface.

The objects associated with the object-oriented information model may include any type of object. As one example, the one or more objects associated with the object-oriented information model may include one or more product definitions. In this case, identifying the one or more objects associated with the object-oriented information model that are associated with the plurality of instances may include identifying that a first one of the one or more product definitions are present more than once in the object-oriented information model.

Further, in this example, storing the one or more objects in the location other than the object-oriented information model may include storing the first one of the one or more product definitions outside of the object-oriented information model. In this case, replacing each of the plurality of instances of the one or more objects with the reference to the one or more objects in the location other than the object-oriented information model may include replacing each instance of the first one of the one or more product definitions present in the object-oriented information model with a reference to a location where the first one of the one or more product definitions are stored outside of the object-oriented information model. As an option, the reference to the location where the first one of the one or more product definitions are stored outside of the object-oriented information model may further include an identifier associated with the first one of the one or more product definitions.

Of course, product definitions are only one example of the objects, in accordance with one embodiment. In various embodiments, the objects may include any number of items and/or descriptors. For example, in one embodiment, the one or more objects associated with the object-oriented information model may include one or more objects associated with fixed definitions.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
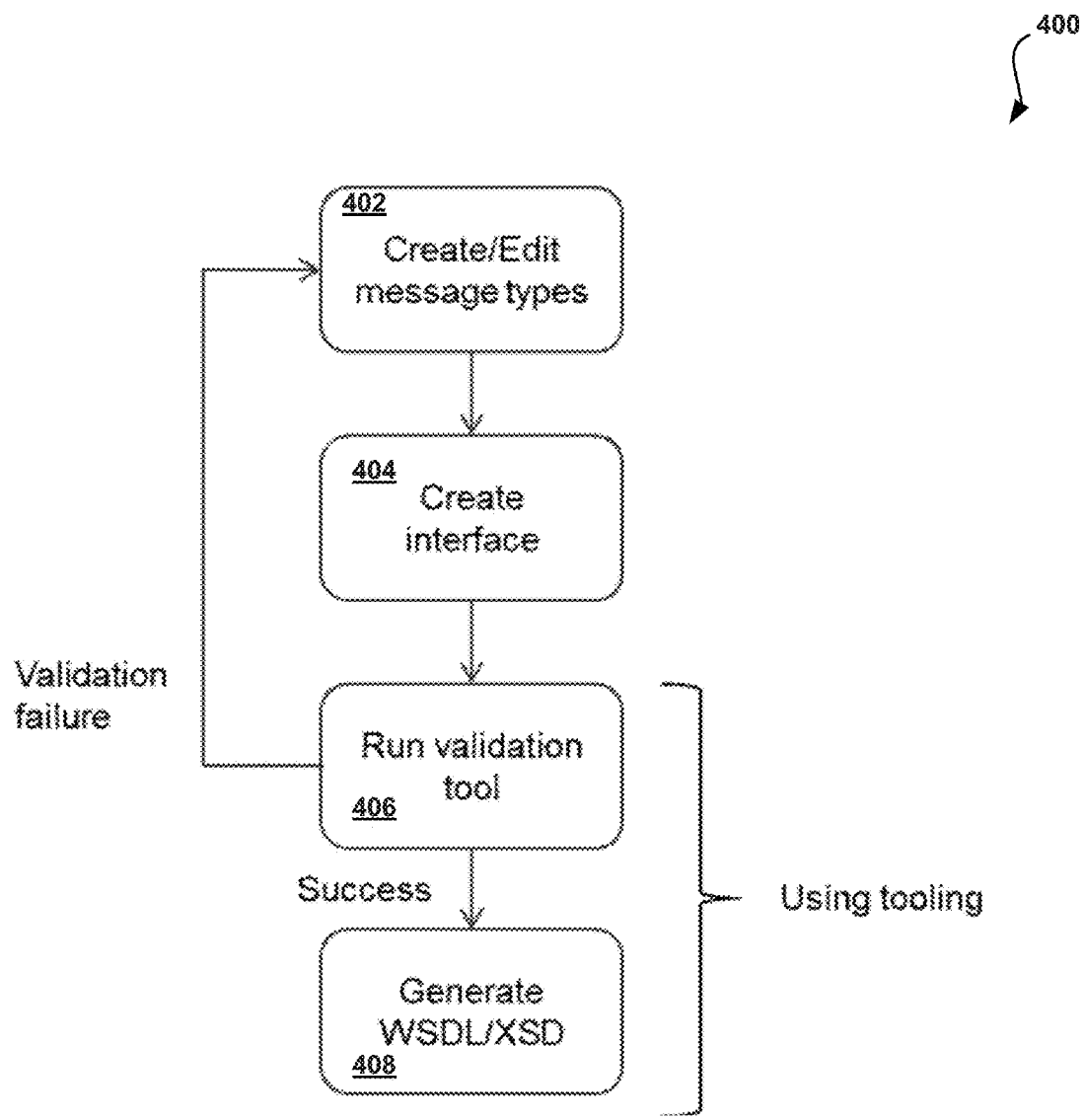
FIG. 4 illustrates a flow diagram for web service interface design, in accordance with one embodiment.

FIG. 4 illustrates a flow diagram 400 for service interface design, in accordance with one embodiment. As an option, the flow diagram 400 may be implemented in the context of the details of FIGS. 1-3. Of course, however, the flow diagram 400 may be implemented in the context of any desired environment. Further, the aforementioned definitions may equally apply to the description below.

As shown, in the context of service interface design, message types are created and/or edited utilizing JAVA® code. See operation 402. Further, one or more interfaces are created. See operation 404.

Additionally, a validation tool is run to validate the interface and associated information. See operation 406. Further, Web Services Description Language (WSDL) files and supporting XML Schema Definition (XSD) files are then generated from the interface created and associated information. See operation 408.

In one embodiment, the validation tool may function to report potential duplicate references within a service operation message, and require the designer to restructure the message or indicate that the references are safe to use. In another embodiment, the validation tool may function to optimize and automatically validate the object-oriented information model.

For example, in one embodiment, a system associated with the flow diagram 300 may function to implement a method by which a set of annotations are added to JAVA® code, where the annotations describe the web service interface. Further, the system may include a validation tool that validates the structure of the message. In this case, the request and return message types may be defined explicitly.

In other words, the javax.jws.Web Service annotation may specify:
@javax.jws.soap.SOAPBinding(
  style=javaz.jws.soap.SOAPBinding.Style.
DOCUTMENT,
  use=javax.jws.soap.SOAPBindgin.Use.LITERAL,
  parameterStyle=javax.jws.soap.SOAPBinding.Parameter
Style.BARE)

Thus, a typical service operation is defined as follows:
public operationNameResponse operationName(operationName request)

The types operationNameResponse and operationName are known as message assembly types, and maybe analyzed and validated utilizing the techniques described herein.

As an example, an application may manage products, customers, and the particular products those customers have purchased and own, which are referred to as product instances. The product definitions may store fixed information such as, for example, a picture of the product, the make, model, description, dimensions and color, etc. Further, the product instance may store the customer specific information such as, for example, date purchased, serial number (if applicable), etc. The information model would naturally define a product instance with an association to the customer who owns it, and the product definition of which it is an instance.

Figure 5:
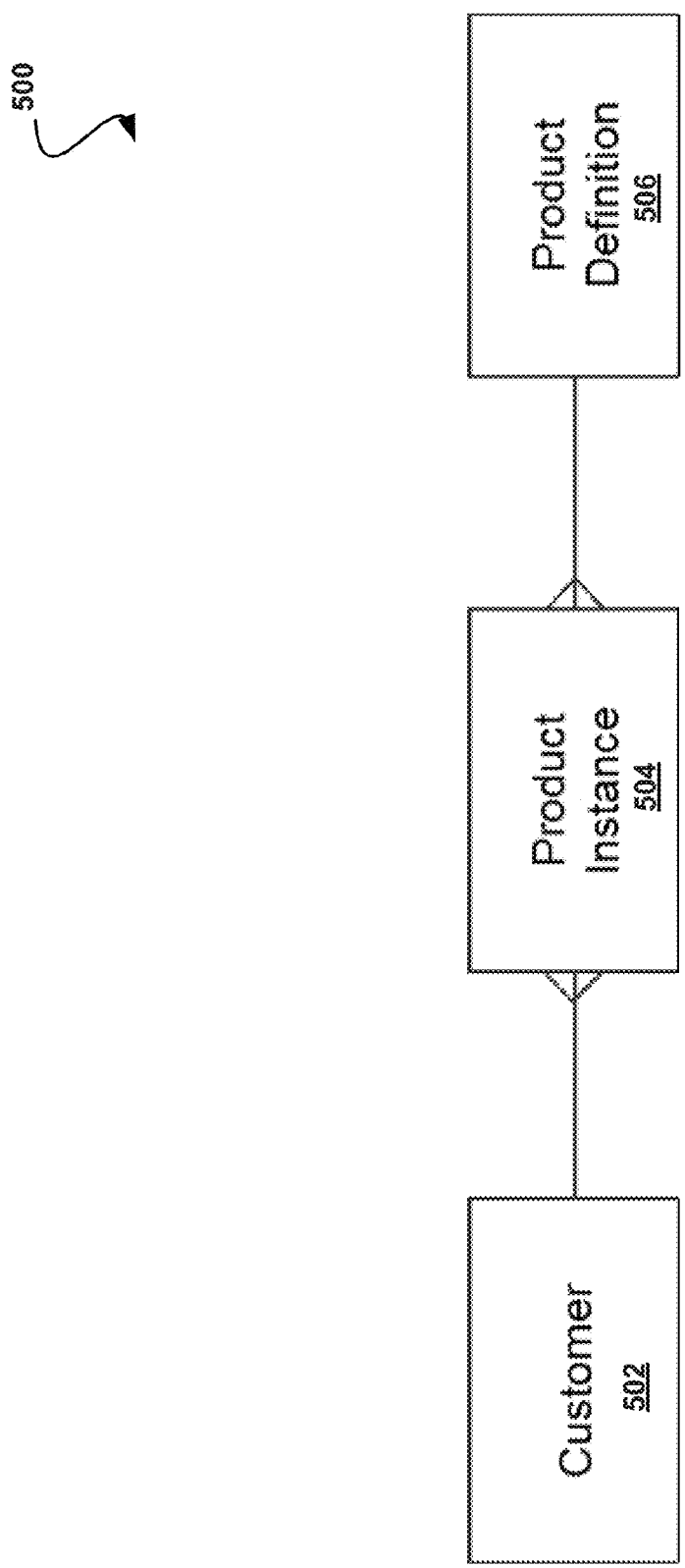
FIG. 5 illustrates an entity diagram illustrating a sample information model of customers and products, in accordance with one example.

FIG. 5 illustrates an entity diagram 500 illustrating a sample information model of customers and products. As shown, the information model defines a product instance 504 with an association to a customer 502 who owns it, and the product definition of which it is an instance 506.

Consider a service operation that retrieves customers, their product instances, and the definitions. If the operation is naively defined to return a list of customers, the XML document returned may be structured as shown in FIG. 6. FIG. 6 shows a data structure 600 illustrating how duplicate data may be structured in an XML document returned by a web service operation that is naively defined.

If the operation returns 100 customers who purchased the same product, the corresponding product definition will be repeated 100 times in the XML document. This may result in many megabytes of duplicated data. The message may therefore be constructed with a separate container for the product definitions that is outside the customer model, and referenced from within the customer model, as shown in FIG. 7.

FIG. 7 shows a data structure 700 illustrating how duplicated data may be removed, in accordance with one embodiment. As an option, the data structure 700 may be implemented in the context of the details of FIGS. 1-6. Of course, however, the data structure 700 may be implemented in the context of any desired environment. Further, the aforementioned definitions may equally apply to the description below.

As shown, the data structure 700 includes a parameter 702 "<ProductDefinitionsReferenced>". The parameter <ProductDefinitionsReferenced> refers to a shared reference container. In one embodiment, this may be added to the message to avoid duplication of referenced data due to the document structure of XML. In one embodiment, the consumer of the operation may find the product definition details of product instances that customers own by matching an embedded identifier ("ProductDefinitionId.id") in the customer structure, and an identifier ("ProductDefinition.id") in the shared reference.

Figure 8:
FIG. 8 shows JAVA® code capable of generating a data structure as illustrated in FIG. 7, in accordance with one embodiment.

In one embodiment, to design this data structure, a designer may follows the flow illustrated in FIG. 4, to generate the Java code illustrated in FIG. 8.

In one embodiment, to design this data structure, a designer may follows the flow illustrated in FIG. 4, to generate the JAVA® code illustrated in FIG. 8.

FIG. 8 shows JAVA® code 800 capable of generating a data structure as illustrated in FIG. 7, in accordance with one embodiment. As an option, the code 800 may be implemented in the context of the details of FIGS. 1-7. Of course, however, the code 800 may be implemented in the context of any desired environment. Further, the aforementioned definitions may equally apply to the description below.

Table 1 shows an annotation summary for the annotations utilized in the context of FIG. 8.

TABLE 1

| Annotation Summary | |
|---|---|
| @Containment | Indicates that an associated entity is contained by its parent entity, meaning that instances of the contained entity are unique for each parent instance. |
| @ID | Indicates that a type is an identifier, meaning that it is a special qualification that defines only attributes necessary to identify an instance of the type. |
| @MessageAssembly | Indicates a message assembly type. |
| @Repository Type | Defines a type in the WSF repository. |
| @SafeReferences | Specifies that references within a message assembly type are safe, meaning that for this operation there will be little or no duplication of instances of the referenced type within the XML message. |
| @SharedReference | Indicates that a field within a message assembly type is a container for references by other types in the message. |

In the context of FIG. 8, the annotation type "Containment" indicates that an associated entity is contained by its parent entity, meaning that instances of the contained entity are unique for each parent instance. The relationship to the contained may be one-to-many, but may also be one-to-one. For example:
@Containment
public IndividualName name;

The opposite of containment is "reference", in which instances of the associated entity may be referenced by many different instances of the parent entity. Associations annotated with @Containment do not necessary need to implement @SafeReference within message assembly.

The annotation type "ID" indicates that a type is an identifier, meaning that it is a special qualification that defines only attributes necessary to identify an instance of the type. ID types are used to reference other types, typically for message assembly,. For example:
@ID
@RepositoryType(name="CustomerProblemID",
originatingType=
"com.amdocs.pbg_portfolio.types_unqualified.vl.customer-businessinteraction.CustomerProblem")
public class CustomerProblemID{

@SemanticTerm(SemanticTermValue.IDENTIFIER)
public java.lang.String id;
}

In the context of FIG. 8, the annotation type "MessageAssembly" indicates a message assembly type. These types may define the schema of the input, output, and fault messages of a web service operation, and may be subject to validation to ensure that the messages do not contain duplicated data as a result of transforming the object oriented model of the service implementation to the document oriented model of the XML message. Message assembly types may be annotated with @XmlRootElement.

Associations within the types referenced by a message assembly type (either directly or indirectly) may conform to a variety of forms. For example, the association may be annotated with @Containment, meaning that the associated instances are unique. As another example, the target type of the association may be annotated with @ID, meaning that the instances it references are identified by their ID only. In case other attributes of the referenced entity are needed, they may be extracted to a different message property (annotated with @SharedReference). As another example, the association may be referenced in a path of one of the @SafeReferences annotations specified by @MessageAssembly. For example:
@MessageAssembly({@SafeReference
 (type="com.amdocs.pbg_portfolio.sei.vl.customer-problemmangement.customerproblemlifecycle-.PhoneLog",
 paths={"cusotmerProblemDetails[ ].activitiesPerformed"}
 )
})
public class RetrieveCustomerProblemResponse{
. . .
}

Table 2 describes parameters associated with the "SafeReferences" annotation used in this example.

TABLE 2

| Parameters | |
|---|---|
| SafeReferences [ ] | value( ) Indicates which references used within this message assembly are safe to use, and will not cause data duplication. Default { }. |

With further reference to FIG. 8, the annotation type "RepositoryType" defines a type and its originating type. Used as part of a type qualification scheme, this annotation may be used by a validation tool when validating shared references.

Table 3 describes parameters associated with the "RepositoryType" annotation, in accordance with one embodiment.

TABLE 3

| Parameters | |
|---|---|
| String | name( ) The formal, technical name of the type as it appears in the XSD. |
| String | originatingType( ) For qualified types, the fully qualified class name of the originating (unqualified) type on which it is based. |

With further reference to FIG. 8, the annotation type "SafeReferences" specifies that references within a message assembly type are safe, meaning that for this operation there may be little or no duplication of instances of the referenced type within the XML message. This annotation may be used to simplify the structure of the message, and avoid the use of a shared reference attributes in the message.

The paths parameter specifies the fields within the message structure that hold the safe references. The path may be specified as a dot-separated list of field names, starting with a field of the message assembly type, and then referencing fields in the nested types. if the path references a List<> type, it may be suffixed with [ ] to indicate that the subsequent name is a field of the underlying type, rather than a field of java.util.List. For example "orderHeader.orderLine[ ].productSpecification".

This path would specify that for the given operation, the message is unlikely to have two different lines of an order that refer to the same product.

Table 4 describes parameters associated with the "SafeReferences" annotation, in accordance with one embodiment.

TABLE 4

| Parameters | |
|---|---|
| String | type( ) Fully qualified class name of the referenced type which potentially has duplicates instances. |
| String [ ] | paths( ) An array of paths to fields in the message structure that are safe references. |

With further reference to FIG. 8, the annotation type "SharedReference" indicates that a field within a message assembly type is a container for references by other types in the message. Fields annotated with @SharedReference may not be part of the functional payload of the operation, but may be added to the message in order to avoid instances of the (shared) reference being duplicated in the XML message. The instances contained in a @SharedReference field may be referenced by an @ID restriction of the same type.

For example, a message assembly type might be defined as follows:
@MessageAssembly
public class RetrieveProductInstances{
   public List productInstances;
   @SharedReference
   public List productSpecificationsReferenced;
   . . .
}

The definition of ProductInstance may contain a reference to a ProductSpecification via its ID, for example:
public class ProductInstance{
   public ProductSpecificationId productSpecification;
   . . .
}

In this way, a message containing hundreds of product instances with many duplicate references to the same product specification will not contain duplicates of the product specifications. The consumer may retrieve the ProductSpecification details from the @SharedReference container using the values of ProductSpecificationID.

Table 5 describes various validations that may be performed on message assembly types by a validation tool, in accordance with one embodiment. In one embodiment, for each of these conditions that fail, an appropriate error message may be generated by the validation tool.

TABLE 5

| | |
|---|---|
| 1. | The message assembly type must implement @XmlRootElement. |
| 2. | The message assembly type may not contain any fields whose types are annotated with @MessageAssembly or @XmlRootElement |
| 3. | All types used by the fields of the message assembly type (including all nested fields) must be annotated with @RepositoryType. |
| 4. | If the @MessaageAssembly type has a field which is annotated with @SharedReference its type must be java.util.List. |
| 5. | If the @MessageAssembly has a field annotated with @SharedReference whose type is java.util.List<t>, the message assembly type must contain a field whose type is annotated with @ID, and whose @RepositoryType.originatingType is the same as t. |
| 6. | The type identified by @SafeReferences.type must not be annotated with @ID. |
| 7. | All paths specified with @SafeReferences.paths must conform to the documented syntax, and must refer to a field (or nested field) within the message assembly type whose type is the same as that specified by @SafeReferences.type. |
| 8. | A field identified by @SafeReferences.paths must not be annotated with @Containment. |
| 9. | If the message assembly type contains a field named f of type t that causes a static cyclic reference (i.e. t contains a field or a nested field whose type is t), f must be defined with a @SafeReferences.path annotation whose type is t. |
| 10. | The message assembly type may not contain duplicate references to the same type t unless t is annotated with @ID, or all the fields of type t are annotated with @Containment or all the fields of type t are identified by paths within a @SafeReference annotation whose type is t. A duplicate reference is either a field within a List, or multiple fields of the same type. |
| 11. | The message assembly type (from its base types and references) may not contain more than 700 non-transient fields. |
| 12. | The message assembly type may not have more than five levels of nested types. |
| 13. | All fields annotated with @SharedReference should be ordered after all other fields in the schema, either by their default ordering, or by use of @XmlType.propOrder. |
| 14. | All fields described by paths within a @SharedReference must be duplicate references to the same type. A duplicate reference is either a field within a List, or multiple fields of the same type. |

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   identifying an object-oriented information model including JAVA™ code associated with JAVA™ programming language to be converted to a document-oriented model described in Extensible Markup Language (XML);
   automatically identifying a plurality of objects associated with the object-oriented information model that are each associated with a plurality of instances, including identifying a plurality of objects that each include a plurality of different object definitions for that object;

optimizing the object-oriented information model by, for each of the plurality of objects each associated with the plurality of instances, storing the plurality of different object definitions in a defined data container outside of the object-oriented information model and replacing each of the plurality of different object definitions with a reference to the different object definitions in the defined data container outside of the object-oriented information model;

annotating the optimized object-oriented information model, in response to performing the storing and the replacing; and automatically validating the optimized object-oriented information model by verifying the reference to the plurality of different object definitions in the defined data container outside of the optimized object-oriented information model is associated with at least one object identifier.

2. The computer program product of claim 1, wherein identifying the plurality of objects associated with the object-oriented information model that are each associated with the plurality of instances includes identifying objects in the JAVA™ code that are each referenced more than once.

3. The computer program product of claim 1, wherein storing the plurality of different object definitions in the location other than the object-oriented information model includes storing the plurality of different object definitions in a defined container that is outside of the object-oriented information model.

4. The computer program product of claim 1, wherein the reference to the defined container that is outside of the object-oriented information model includes an identification associated with the plurality of different object definitions.

5. The computer program product of claim 1, further comprising computer code for reporting that there are the plurality of objects each associated with the plurality of instances in the object-oriented information model.

6. The computer program product of claim 5, wherein reporting that there are one or more objects each associated with the plurality of instances in the object-oriented information model includes displaying a message utilizing a user interface.

7. The computer program product of claim 6, further comprising computer code for indicating the object-oriented information model is safe to use, based on the automatic validation.

8. The computer program product of claim 1, further comprising computer code for converting at least a portion of the object-oriented information model including the JAVA™ code to the document-oriented model described in XML as a result of the automatic validation.

9. The computer program product of claim 1, wherein automatically validating the optimized object-oriented information model further includes verifying the reference to the plurality of different object definitions in the location other than the object-oriented information model includes a type of java.util.List.

10. The computer program product of claim 1, wherein automatically validating the optimized object-oriented information model further includes verifying the reference to the plurality of different object definitions in the location other than the object-oriented information model is associated with at least one object identifier.

11. The computer program product of claim 1, wherein the computer program product is operable such that the plurality of objects associated with the object-oriented information model include one or more product definitions.

12. The computer program product of claim 11, wherein the computer program product is operable such that identifying the plurality of objects associated with the object-oriented information model that are each associated with the plurality of instances includes identifying that a first one of the one or more product definitions are present more than once in the object-oriented information model.

13. The computer program product of claim 12, wherein storing the plurality of different object definitions in the location other than the object-oriented information model includes storing the first one of the one or more product definitions outside of the object-oriented information model.

14. The computer program product of claim 13, wherein replacing each of the plurality of instances of the one or more objects with the reference to the one or more objects in the location other than the object-oriented information model includes replacing each instance of the first one of the one or more product definitions present in the object-oriented information model with a reference to a location where the first one of the one or more product definitions are stored outside of the object-oriented information model.

15. The computer program product of claim 14, wherein the computer program product is operable such that the reference to the location where the first one of the one or more product definitions are stored outside of the object-oriented information model further includes an identifier associated with the first one of the one or more product definitions.

16. The computer program product of claim 1, wherein the computer program product is operable such that the one or more objects associated with the object-oriented information model include one or more objects associated with fixed definitions.

17. A method, comprising;
identifying an object-oriented information model including JAVA™ code associated with JAVA™ programming language to be converted to a document-oriented model described in Extensible Markup Language (XML);

automatically identifying a plurality of objects associated with the object-oriented information model that are each associated with a plurality of instances, including identifying a plurality of objects that each include a plurality of different object definitions for that object;

optimizing the object-oriented information model by, for each of the plurality of objects each associated with the plurality of instances, storing the plurality of different object definitions in a defined data container outside of the object-oriented information model and replacing each of the plurality of different object definitions with a reference to the different object definitions in the defined data container outside of the object-oriented information model;

annotating the optimized object-oriented information model, in response to performing the storing and the replacing; and automatically validating the optimized object-oriented information model by verifying the reference to the plurality of different object definitions in the defined data container outside of the optimized object-oriented information model is associated with at least one object identifier.

18. A system comprising:

a memory system; and one or more processing cores coupled to the memory system and that are each configured for:

identifying an object-oriented information model including JAVA™ code associated with JAVA™ programming language to be converted to a document-oriented model described in Extensible Markup Language (XML);

automatically identifying a plurality of objects associated with the object-oriented information model that are each associated with a plurality of instances, including identifying a plurality of objects that each include a plurality of different object definitions for that object;

optimizing the object-oriented information model by, for each of the plurality of objects each associated with the plurality of instances, storing the plurality of different object definitions in a defined data container outside of the object-oriented information model and replacing each of the plurality of different object definitions with a reference to the different object definitions in the defined data container outside of the object-oriented information model;

annotating the optimized object-oriented information model, in response to performing the storing and the replacing; and automatically validating the optimized object-oriented information model by verifying the reference to the plurality of different object definitions in the defined data container outside of the optimized object-oriented information model is associated with at least one object identifier.

* * * * *